US010892939B2

(12) United States Patent
Castaldelli et al.

(10) Patent No.: US 10,892,939 B2
(45) Date of Patent: Jan. 12, 2021

(54) SYSTEM AND METHOD FOR NETWORK APPARATUS MANAGEMENT (71) Applicant: TELECOM ITALIA S.p.A., Milan (IT)

(72) Inventors: Luca Castaldelli, Turin (IT); Mauro Cociglio, Turin (IT); Giuseppe Fioccola, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 50 days.

(21) Appl. No.: 15/312,093

(22) PCT Filed: May 27, 2014

(86) PCT No.: PCT/EP2014/060992
§ 371 (c)(1),
(2) Date: Nov. 17, 2016

(87) PCT Pub. No.: WO2015/180761
PCT Pub. Date: Dec. 3, 2015

(65) Prior Publication Data
US 2017/0085414 A1    Mar. 23, 2017

(51) Int. Cl.
*G06F 15/173* (2006.01)
*H04L 12/24* (2006.01)
*H04L 12/26* (2006.01)

(52) U.S. Cl.
CPC ........ *H04L 41/046* (2013.01); *H04L 41/0213* (2013.01); *H04L 41/0813* (2013.01);
(Continued)

(58) Field of Classification Search
CPC ............... H04L 41/046; H04L 41/0213; H04L 41/0813; H04L 41/0853; H04L 43/0829; H04L 43/087
(Continued)

(56) References Cited

U.S. PATENT DOCUMENTS 7,656,818 B1    2/2010  Baroudi et al.
8,204,851 B2 *  6/2012  Rong ................ G06Q 10/06
                                            707/608
(Continued)

OTHER PUBLICATIONS

International Search Report dated Feb. 17, 2015, in PCT/EP2014/060992, filed May 27, 2014.
(Continued)

*Primary Examiner* — Kaylee J Huang
(74) *Attorney, Agent, or Firm* — Oblon, McClelland, Maier & Neustadt, L.L.P.

(57) ABSTRACT

A system and method for managing a network apparatus of a communication network. The system includes a network management center including a management-on-board manager MoB-M and a management-on-board agent MoB-A executed at the network apparatus. During its execution, the agent MoB-A performs at least part of a management task on the network apparatus. Besides, during its execution the agent MoB-A retrieves at least one instruction from the manager MoB-M, and executes it for completing the management task. This way, the manager MoB-M may dynamically adapt the behavior of the agent MoB-A to unforeseen events or changes occurring in the network, without the need to rewrite the whole agent logic.

17 Claims, 3 Drawing Sheets (52) U.S. Cl.
CPC ........ *H04L 41/0853* (2013.01); *H04L 43/087* (2013.01); *H04L 43/0829* (2013.01); *H04L 43/0852* (2013.01)

(58) Field of Classification Search
USPC ........................................ 709/223, 203, 224
See application file for complete search history.

(56) References Cited

U.S. PATENT DOCUMENTS

| | | | |
|---|---|---|---|
| 8,335,171 | B1 | 12/2012 | Purkayastha et al. |
| 8,621,062 | B1* | 12/2013 | Anderson ............... G06F 11/30 709/223 |
| 8,819,155 | B2* | 8/2014 | Ocher .................. G06F 21/629 709/206 |
| 2002/0095459 | A1* | 7/2002 | Laux ....................... H04L 29/06 709/203 |
| 2004/0044758 | A1* | 3/2004 | Palmer ................ H04L 41/0213 709/223 |
| 2008/0189446 | A1 | 8/2008 | Pulpatta et al. |
| 2009/0183151 | A1* | 7/2009 | Gharabally ............... G06F 8/61 717/178 |
| 2009/0217184 | A1* | 8/2009 | Amundson ......... G06F 9/45512 715/763 |
| 2011/0131398 | A1 | 6/2011 | Chaturvedi et al. |
| 2012/0011511 | A1* | 1/2012 | Horvitz ................... G06F 9/461 718/100 |
| 2012/0254291 | A1* | 10/2012 | Feldman ................ G06Q 10/06 709/203 |
| 2013/0194974 | A1 | 8/2013 | Purkayastha et al. |
| 2014/0289716 | A1* | 9/2014 | Adl-Tabatabai ...... G06F 8/4441 717/146 |
| 2015/0193296 | A1* | 7/2015 | Chen .................... G06F 11/079 714/15 |

OTHER PUBLICATIONS

Wallin et al., "Automating Network and Service Configuration using NETCONF and YANG", USENIX, Sep. 23, 2011, 13 pages, XP61010545A.

Office Action dated Aug. 5, 2020 in European Application No. 14730459.6.

* cited by examiner

SYSTEM AND METHOD FOR NETWORK APPARATUS MANAGEMENT

TECHNICAL FIELD

The present invention relates to the field of communication networks. In particular, the present invention relates to a system and method for network apparatus management.

BACKGROUND ART

In communication networks (e.g. IP networks), network management refers to a number of tasks pertaining to the operation, administration, maintenance and provisioning of the network apparatuses.

Operation comprise management tasks aimed at keeping the communication network and the services that the network provides up and running smoothly. Administration comprises management tasks aimed at tracking the network resources and their assignment to the various services. Maintenance comprises management tasks aimed at repairing and upgrading the network resources (e.g. addition of new hardware, adjustment of configuration parameters of network apparatuses, etc.). Provisioning comprises management tasks aimed at configuring the network apparatuses, namely at customizing then network apparatuses to support one or more given service(s) within a certain network environment.

The above network management tasks are typically carried out by a Network Management Centre (in brief, NMC). In order to execute a management task upon the network apparatuses, management instructions are typically sent from the NMC to the network apparatuses. The management instructions are typically sequentially imparted to every network apparatus to be managed either manually by an operator or automatically by a suitable tool of the NMC. Each network apparatus sequentially executes the received configuration instructions one-by-one. The management instructions may be imparted via a Command Line Interface (CLI) (using e.g. commands of the IOS or IOX operating system for Cisco apparatuses or Junos commands for Juniper apparatuses) or via a management protocol, such as for instance the Simple Network Management Protocol (SNMP).

U.S. Pat. No. 7,656,818 describes methods and systems for providing customizable network device management, in which a user-created policy is received and registered on a network device, such as a router. An event identified by the policy is detected at the network device. In response, the policy runs on the network device and an action specified by the policy is performed. The policy can be prepared by a user of a remote computer device. The policy can be provided in the form of a script or applet executable by the network device.

SUMMARY OF THE INVENTION

The Applicant has noticed that the above described known network apparatus management approaches have some drawbacks.

As to the CLI (or SNMP) approach, reference is made to three exemplary typical management tasks: (i) configuring network apparatuses (e.g. upon their deployment or when a new hardware is added or a new service shall be implemented), (ii) discovering the configuration of network apparatuses (namely discovering its hardware and software equipment) and (iii) monitoring the functionality of the network apparatus (e.g. by collecting performance parameters for measuring packet loss rate, delay, jitter, etc.).

With reference to (i), configuration instructions via CLI or in the form of SNMP SetRequest messages are typically dispatched to each network apparatus to be configured. This makes the configuration procedure long and complex. The configuration instructions shall indeed be personalized for each network apparatus, and shall be sent to the network apparatuses only during low-traffic hours (e.g. at night), so that more computational resources are available at the network apparatuses for management purposes and the impact on user traffic of possible service interruptions is minimized. Further, the dispatch of some configuration instructions to multiple network apparatuses (e.g. to deploy a new service) shall be synchronized, in order to avoid failures. For all these reasons, configuring the network apparatuses of a communication network (which may comprise hundreds of network apparatuses) via CLI or SNMP is very complex and might take a very long time.

With reference then to (ii), discovery instructions via CLI or in the form of SNMP GetRequest messages are typically dispatched to the network apparatus whose configuration is to be discovered. This discovery procedure is periodically iterated, in order to detect configuration changes, alarms, etc. in nearly real time and keep the network inventory updated. However, while a timely detection would require more frequent iterations of the discovery procedure, too frequent iterations might needlessly occupy computational resources and bandwidth in the communication network.

With reference then to (iii), in order to monitor the functionality of the network apparatuses (e.g. collect performance parameters from network apparatuses), a polling is periodically performed via CLI or in the form of SNMP GetRequest messages on the network apparatuses. The optimal polling period depends on the monitoring goal and is typically of 5-15 minutes. However, practically, the choice of the polling period is bound to other variables such as the ratio between the number of network apparatuses and the number of computers of the NMC, the complexity of the polling (namely, the amount of data to be collected from each network apparatus) and the response time of the network apparatuses (which in turn depends on the current network apparatuses workload).

As to the approach described by U.S. Pat. No. 7,656,818, it partially overcomes some of the above discussed drawbacks of the CLI (or SNMP) approach. Indeed, instead of providing configuration instructions, discovery instructions or monitoring instructions from the NMC to all the relevant network apparatuses when a configuration procedure, a discovery procedure, or a monitoring procedure shall be carried out, each network apparatus might be in principle provided with scripts that allow the network apparatus autonomously performing such tasks.

The approach of U.S. Pat. No. 7,656,818 however exhibits other drawbacks.

In particular, the inventors have noticed that the scripts (or, more generally, the policies) described by U.S. Pat. No. 7,656,818 are static, in that they are defined by a user of a remote computer device and loaded on the network apparatuses. Hence, the scripts are suitable for reacting to a predefined set of events and carrying out predefined actions according to a predefined logic. If, for instance, an event unforeseen by the script logic happens, the script is incapable to tackle it until an upgraded version of the script is developed and loaded on the network apparatus.

For instance, following the approach of U.S. Pat. No. 7,656,818, the network apparatuses of a certain communication network in principle might be provided with a configuration script suitable for automatically and autonomously configuring a certain set of resources, which are normally comprised in the equipment of network apparatuses of that communication network. If, however, a new type of resource is added to the network apparatuses (e.g. LTE antennas), the configuration script is not capable to configure it. A new version of the configuration script, which also comprises configuration instructions for the new type of resource, has to be developed and loaded onto the network apparatuses. This takes a long time and requires the intervention of a skilled operator capable of rewriting the script.

Similar considerations also apply to the scenarios of discovering and monitoring.

In view of the above, the Applicant has tackled the problem of providing a system and method for network apparatus management which overcomes the aforesaid drawbacks, namely in which the network apparatus, which is provided with an agent configured to actively take part to some network management tasks, is capable of automatically adapting its behaviour in a dynamic way to changes occurring in the communication network (e.g. new types of events, new types of hardware, etc.), without requiring the intervention of an operator rewriting the agent logic.

In the present description and in the claims, the term "agent" will designate a software program executable at a network apparatus and whose algorithm contains specific instructions that the agent should perform in order to carry out at least part of a certain management task (e.g. a configuration task, a discovery task or a monitoring task). An agent may be developed using different programming languages. In particular, an agent may be developed by using either a compiled programming language or an interpreted programming language. In the latter case, the agent may be implemented either as a script or a software application.

According to a first aspect, the present invention provides a system for managing a network apparatus of a communication network, the system comprising:
 a network management center provided with a management-on-board manager; and
 a management-on-board agent executable at the network apparatus,
wherein the management-on-board agent is configured to perform, when executed at the network apparatus, at least part of a management task on the network apparatus, the management-on-board agent being further configured to, during its execution, retrieve at least one instruction from the management-on-board manager and execute the at least one instruction for completing the management task.

Preferably, the management-on-board agent is configured to start and/or stop its execution upon reception of a command from the network management center.

Alternatively, the management-on-board agent is configured to automatically start and/or stop its execution upon occurrence of a predefined event.

Preferably, the management-on-board agent is configured to retrieve the at least one instruction from the management-on-board manager upon occurrence of an event not foreseen by the logic of the management-on-board agent.

Alternatively, the management-on-board agent is configured to retrieve the at least one instruction from the management-on-board manager each time the management-on-board agent is executed, the management task being carried out by default through execution of the at least one instruction from the management-on-board manager.

Preferably, the management-on-board manager is configured to transmit the at least one instruction to the network apparatus before execution of the management-on-board agent is started.

Alternatively, the management-on-board manager is configured to transmit the at least one instruction to the network apparatus while the management-on-board agent is executed.

Preferably, the at least one instruction is in the form of an ordered list of single instructions compatible with the operating system of the network apparatus and directly executable by the network apparatus.

Alternatively, the at least one instruction is in the form of an ordered list of single apparatus-independent instructions whose format is unique for all network apparatuses of the communication network.

Preferably, the management-on-board agent is configured to sequentially execute one-by-one the instructions of the ordered list of single instructions.

Preferably, the ordered list of single instructions is comprised within an instruction file, each single instruction being set forth in a respective line of the instruction file.

Profitably, the management-on-board manager is configured to load the instruction file into a predefined directory of the network apparatus, the management-on-board agent being configured to retrieve the instruction file from the predefined directory during its execution.

Preferably, the management-on-board agent is configured to perform one or more of the following operations upon each single instruction of the ordered list of single instructions:
 correct syntax errors;
 check whether the single instruction is an allowed instruction;
 if the single instruction is a single apparatus-independent instruction whose format is unique for all network apparatuses of the communication network, translate the single instruction into a corresponding instruction compatible with the operating system of the network apparatus and directly executable by the network apparatus; and
 customize the single instruction based on the actual configuration of the network apparatus.

Preferably, the management-on-board agent is also configured to interrupt the execution of the ordered list of single instructions, if an instruction could not be properly executed.

According to preferred variants, the management-on-board agent is also configured to annul the already executed instructions of the ordered list of single instructions by performing a number of counter-commands.

The management-on-board agent is configured to autonomously determine the counter-commands, or to request the counter-commands to the management-on-board manager.

Preferably, the management-on-board agent is also configured to detect at least one output generated by the network apparatus upon execution of the at least one instruction.

Preferably, the management-on-board agent is further configured to generate a report file containing the at least one output generated by the network apparatus upon execution of the at least one instruction and to send the report file to the network management centre.

According to preferred variants, the management-on-board agent is further configured to format the at least one output generated by the network apparatus upon execution of the at least one instruction into an apparatus independent format which is unique for all the network apparatuses of the communication network.

Preferably, the management-on-board agent is written in a scripting language. Alternatively, the management-on-board agent is written in a compiled language.

The management-on-board agent is configured to be executed occasionally, periodically or continuously.

According to a second aspect, the present invention provides a method for managing a network apparatus of a communication network, the method comprising:

executing a management-on-board manager at a network management center cooperating with the communication network; and executing a management-on-board agent at the network apparatus, wherein the management-on-board agent performs at least part of a management task on the network apparatus and, during its execution, retrieves at least one instruction from the management-on-board manager and executes the at least one instruction for completing the management task.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
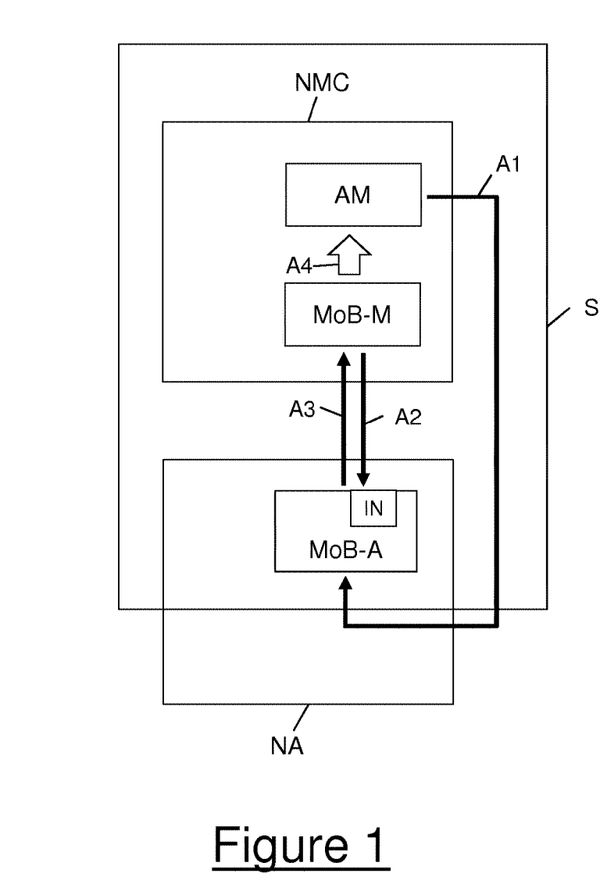
FIG. 1 schematically shows a system for managing a network apparatus, according to an embodiment of the present invention.

FIG. 1 schematically shows a system S for managing a network apparatus NA according to embodiments of the present invention.

The network apparatus NA is preferably part of a communication network, which for simplicity is not shown in the drawings. The communication network may be a wired network, a wireless network or a combination thereof. The communication network may be for instance an IP network, an MPLS network, etc. The network apparatus NA may be a router, a switch or any computing device adapted to support transmission of digital data flows within the communication network. The network apparatus NA preferably is a programmable network apparatus, such as for instance a Cisco network apparatus provided with the EEM (Embedded Event Manager) tool, a Juniper network apparatus supporting the Junos Script tool, or a SDN (Software Defined Network) apparatus.

Preferably, the system S for managing the network apparatus NA comprises a network management centre NMC cooperating with the network apparatus NA. More generally, the network management centre NMC is responsible for performing management tasks (namely, operation, administration, maintenance and provisioning tasks as defined above) upon all the network apparatuses of the communication network, including the network apparatus NA. The network apparatus NA and the network management centre NMC are reciprocally interconnected by means of a bidirectional link, which possibly passes through other network apparatuses (not shown) of the communication network.

According to embodiments of the present invention, the network management centre NMC is preferably provided with an agent manager AM and a management on board manager MoB-M. The network management center NMC may also comprise other components, as it will be described in detail herein after.

Further, according to embodiments of the present invention, the system S for managing the network apparatus NA also comprises a management on board agent MoB-A installed on and executable at the network apparatus NA. The agent MoB-A may be developed using different programming languages. In particular, the agent MoB-A may be developed by using a compiled programming language, for instance Junos SDK in case of Juniper network apparatuses. Alternatively, the management on board agent MoB-A may be written in a scripting language which may be interpreted (and not compiled) by the software environment of the network apparatus NA. According to a preferred variant, the management on board agent MoB-A is a script. For instance, in case of a Cisco network apparatus provided with the EEM (Embedded Event Manager) tool, the agent MoB-A is written in TCL (Tool Command Language). In case of a Juniper network apparatus supporting the Junos Script tool, the agent MoB-A is preferably written using Junos as a scripting language.

Preferably, the management on board agent MoB-A is configured to carry out at least part of a management task by cooperating with the management on board manager MoB-M. As it will be described in detail herein after, exemplary management tasks that the management on board agent MoB-A may be configured to carry out (in cooperation with the management on board manager MoB-M) are configuration, discovery and monitoring.

More particularly, the agent MoB-A is configured to perform a number of operations needed to carry out a certain management task. Such operations are static, in that they are explicitly defined by the agent logic, so that the agent performs them in the very same way each time it is executed. Besides, the agent MoB-A is also configured to receive from the manager MoB-M at least one instruction for performing at least one further operation needed to carry out that management task. Hence, by sending suitable instructions to the agent MoB-A, the manager MoB-M may dynamically modify the behaviour of the agent MoB-A, for instance in order to adapt it to possible events (e.g. addition of new hardware, detection of an unknown alarm, etc.) not explicitly foreseen by the static logic of the agent MoB-A.

In order to execute the instructions received from the manager MoB-M, the agent MoB-A is preferably provided with an interpreter IN. The interpreter IN, as it will be described in further detail herein after, is preferably a software routine which is invoked by the agent MoB-A when instructions from the NMC shall be executed. The interpreter may be unique for all the agents running at the network apparatus NA. Alternatively, each agent may be provided with its own interpreter. As it will be described in detail herein after, the interpreter IN is configured to receive an ordered sequence of instructions and process each single instruction in order to provide a corresponding executable instruction of the operating system of the network apparatus NA (namely, IOS or IOX instructions for Cisco apparatuses or Junos instructions for Juniper apparatuses). Typically, the interpreter IN is not a programming language interpreter, and accordingly does not output flow control commands (e.g. if then else).

The agent MoB-A is preferably loaded onto the network apparatus NA by the agent manager AM (see arrow A1 in FIG. 1) that, more generally, is responsible for loading management on board agents onto the various network apparatuses of the communication network. The agent manager AM is also preferably responsible for the activation and deactivation of the agents at the various network apparatuses, including the agent MoB-A at the network apparatus NA. The manager MoB-M, besides, is preferably configured to notify to the agent manager AM the absence of an agent on a network apparatus or the presence of a non updated agent (see arrow A4 in FIG. 1). The agent manager AM is preferably configured to react to such notifications by loading on the network apparatuses updated versions of the agents.

Figure 2:
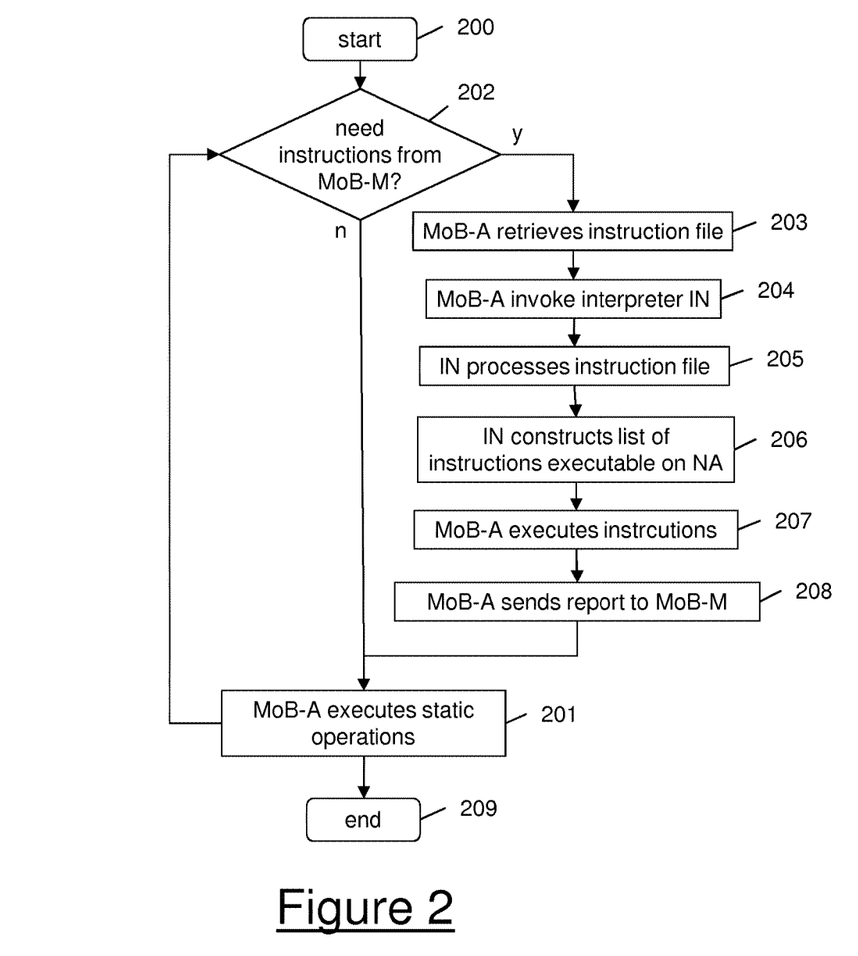
FIG. 2 is a flow chart of the operation of an agent, according to an embodiment of the present invention.

With reference now to the flow chart of FIG. 2, the operation of the system S (and, in particular, of the agent MoB-A) will be described in further detail.

The execution of the management on board agent MoB-A is firstly started at the network apparatus NA (step 200). The execution of the management on board agent MoB-A may be started upon an explicit command from the NMC, in particular from the agent manager AM. Alternatively, the agent MoB-A may automatically start without intervention of the agent manager AM, for instance at a predefined time and date. The agent MoB-A may be executed occasionally. For instance, if the agent MoB-A is a configuration script, it is executed when the configuration of the network apparatus NA shall be changed or updated. If instead the agent MoB-A is a monitoring script (e.g. a script configured to generate packet counters and periodically send them to the NMC), it is continuously executed as long as the monitoring procedure has to be performed. Alternatively, the agent MoB-A may be executed periodically. For instance, if the agent MoB-A is a discovery script, it may be executed periodically for periodically iterating the discovering of the network apparatus NA.

Then, the agent MoB-A starts performing the static operations defined by its predefined logic (step 201). Such static operations depend on the management task that has to be done. For instance, by way of non limiting example, if the agent MoB-A is a monitoring agent (e.g. an agent configured to generate packet counters for a certain data flow and periodically send them to the NMC), step 201 may comprise several sub-steps during which the agent MoB-A identifies the data flow to be monitored amongst the data flows incoming at the network apparatus NA, initializes a set of packet counters, suitably increases their values upon transmission from the network apparatus NA of the packets of the identified data flow, checks whether a monitoring period is expired and, in the affirmative, sends the current counter values to the NMC.

Optionally, a static operation performed by the agent MoB-A may comprise the activation of a further management on board agent executed on the same network apparatus NA, as it will be described in detail herein after.

The agent MoB-A continues performing the static operations defined by its predefined logic until it realizes that, in order to continue the execution of its management task, it needs instructions from the manager MoB-M (step 202). This may happen, for instance, because the agent MoB-A detects an "unknown event", namely an event which is not foreseen by the predefined, static logic of the agent MoB-A, such as detection of new hardware at the network apparatus NA, detection of an alarm of an unknown type, etc. The agent MoB-A may need instructions from the manager MoB-M also under other circumstances. For instance, the static logic of the agent MoB-A may be configured so that, each time the agent is executed for carrying out a certain management task on the network apparatus NA (e.g. configuration or discovery), at least part of the management task is carried out by default through execution of detailed instructions provided by the manager MoB-M. For instance, in case the agent MoB-A is a discovery or configuration agent, its static logic may be configured so that, when its execution is started, the agent MoB-A carries out few operations propaedeutic to the retrieval of instructions from the manager MoB-M, and then immediately needs discovery or configuration instructions from the manager MoB-M.

As the agent MoB-A realizes that it needs instructions from the manager MoB-M, it preferably retrieves an instruction file which contains instructions generated by the manager MoB-M and which the manager MoB-M has loaded onto the network apparatus NA, see arrow A2 in FIG. 1 (step 203).

The instructions may be either automatically generated by the management on board manager MoB-M or they may be generated by a human operator and input to the manager MoB-M. The instructions are preferably in the form of an ordered list of separate CLI instructions compatible with the operating system of the network apparatus NA, and hence directly executable by the network apparatus NA. Each instruction preferably comprises a command and, optionally, one or more parameters of the command. For instance, in case the network apparatus NA is a Cisco apparatus, the instructions may be IOS/IOX discovery instructions such as:
show version 1 include IOS;
show interfaces description;
show mac-address-table dynamic;
show arp vrf LTE_TRAFFIC.

In case of a Juniper apparatus, corresponding JunOS instructions may be provided.

Alternatively, each single instruction may be a "higher level instruction", namely an apparatus-independent instruction whose format is unique for all the network apparatuses of the communication network and is independent of the type, operating system, etc. of the specific network apparatus to which the instruction is addressed. The format of the higher level instructions may be defined by the network manager. Within the instruction file, each higher level instruction is preferably identified by one or more predefined control characters, indicating that the instruction shall be translated before being executed. In particular, a higher level instruction may be &command parameter1 parameter2, wherein & is a control character indicating that command is an apparatus type-independent command that shall be translated before execution. On the other hand, a higher level instruction may be command € parameter1 parameter2, wherein € is a control character indicating that parameter 1 is a variable that shall be replaced by its current value (e.g. 1000) at the network apparatus NA. Both the above mentioned control characters may be used in a same instruction (e.g. &command € parameter1 parameter2).

An exemplary higher level instruction will be described herein after. According to some variants, the instruction file may comprise both CLI instructions and higher level instructions. In any case (namely, both in case of CLI instructions and in case of higher level instructions), within the instruction file each instruction is preferably set forth in a respective line of the file.

The instruction file is then preferably sent from the manager MoB-M to the network apparatus NA. The instruction file may be sent from the manager MoB-M to the network apparatus NA using any known protocol suitable for transferring files, e.g. FTP (File Transfer Protocol), SFTP (Simple File Transfer Protocol), TFTP (Trivial File Transfer Protocol), Telnet, SSH (Secure Shell), etc. At the network apparatus NA, the instruction file is preferably stored in a predefined local directory of the network apparatus NA, which the agent MoB-A uses for exchanging information with the manager MoB-M.

The manager MoB-M may generate and load the instruction file onto the network apparatus NA in response to an explicit request generated by the agent MoB-A during its execution. For instance, if the agent MoB-A detects an "unknown event" while it is executing the operations defined by its static logic, it preferably reports it to the MoB-M and requests instructions to it. In such case, the manager MoB-M processes the request of the agent MoB-A, thereby generating the instruction file containing instructions allowing the agent MoB-A to properly react to the "unknown event". For instance, in response to an unknown type of alarm from one of the interfaces of the network apparatus NA, the management on board manager MoB-M may generate an instruction to switch off the interface that generated the alarm.

Alternatively, the manager MoB-M may load the instruction file onto the network apparatus NA before execution of the agent MoB-A is started. For instance, if the agent MoB-A is a configuration script and an update of the configuration of the network apparatus NA is scheduled at a certain date and time, the manager MoB-M preferably loads an instruction file containing the configuration instructions onto the network apparatus NA before the scheduled date and time. In such case, the static logic of the agent MoB-A contains an instruction of retrieving the file with the configuration instructions.

In any case, at step 203 the agent MoB-A preferably initializes a number of variables, namely:

Directory_name: name of the predefined local directory which the agent MoB-A uses for exchanging information with the manager MoB-M;

FTP_server_name: name of the FTP server to which the agent MoB-A shall send its report file(s) (if FTP is used for file exchange);

Instruction_file_name: name of the instruction file to be retrieved.

The values at which such variables are initialized is preferably provided to the agent MoB-A by the manager MoB-M. Hence, for retrieving the instruction file at step 203 from the predefined local directory, the agent MoB-A preferably uses the values of the variables Directory_name and Instruction_file_name.

Then, the agent MoB-A preferably invokes the interpreter IN (step 204).

The interpreter IN preferably processes the instruction file (step 205). In particular, for each line of the instruction file (namely, for each single instruction of the instruction file), the interpreter IN preferably carries out one or more of the following sub-steps:

corrects syntax errors and optionally cancels possible comments and spaces;

checks whether the instruction contained in that line is an allowed instruction (for instance, if the agent MoB-A is a discovery script, only read or get instructions are allowed);

if the instruction is a higher level instruction as described above, it optionally translates the higher level instruction in a corresponding instruction compatible with the type, model and operating system of the network apparatus NA;

if needed, customizes the instruction based on the actual configuration of the network apparatus (for instance, if the instruction generically provides for "discovering port status", the interpreter IN translates this instruction into a number of instructions, one per each port of the network apparatus, each single instruction being customized e.g. with the port identifier. Number of ports and port identifiers are information locally available at the network apparatus NA, e.g. from its MIB).

Hence, upon execution of the above sub-steps on each line of the instruction file, the interpreter IN provides a list of instructions executable by the agent MoB-A on the network apparatus NA (step 206).

An example of the interpreter function is described herein below. For instance, the instruction file may comprise a higher level instruction list active interfaces (preferably with the control character & prepended thereto). If the network apparatus NA is, for instance, a Cisco router, the interpreter IN preferably translates the higher level instruction list active interfaces into the corresponding apparatus-specific instruction show ip interface brief. If, otherwise, the network apparatus NA is a Juniper apparatus, the interpreter IN preferably translates the higher level instruction list active interfaces into the corresponding apparatus-specific instruction show interfaces terse.

Then, the agent MoB-A preferably executes the instructions provided by the interpreter IN, one by one (step 207).

Preferably, at step 207 the agent MoB-A also detects the output (if any) generated by the network apparatus NA upon execution of each single instruction provided by the interpreter IN.

For instance, the execution of a discovery instruction requesting the value of a certain variable provides as output the requested value. For example, the execution of the above mentioned IOS/IOX discovery instruction "show version | include IOS" provides as output the release of the software running at the network apparatus NA. On the other hand, the execution of a configuration instruction to set a certain variable equal to a certain value provides as output an indication of whether the outcome of the setting operation is positive or not.

Optionally, the agent MoB-A may be configured to interrupt the execution of the list of instructions provided by the interpreter IN. For instance, if the execution of a certain instruction provides as output an indication that the instruction could not be properly executed, the agent MoB-A may omit the execution of the subsequent instructions.

According to particularly advantageous embodiments, the agent MoB-A may be configured not only to omit the execution of the subsequent instructions, but also to perform a "rollback" of the already executed instructions, namely to annul the already executed instructions by performing a number of counter-commands. To this purpose, the agent MoB-A is preferably configured to access a table where each possible instruction executable within the software environment of the network apparatus NA is associated with a respective counter-command. For performing the rollback, the agent MoB-A preferably looks up the table for building an ordered list of counter-commands associated with the already executed instructions, and performs them. This is advantageous e.g. in case of a configuration script, where the rollback prevents an error occurring upon execution of a certain configuration operation from resulting in an incomplete (and hence incorrect) configuration of the network apparatus NA.

Alternatively, the agent MoB-A may be configured to, after interrupting the execution of the list of instruction, report the interruption to the manager MoB-M and request further instructions to it. In such case, the manager MoB-M may provide to the agent MoB-A further instruction file containing further instructions, e.g. a list of counter-commands for performing a rollback of the already executed instructions.

After completing execution of all the instructions provided by the interpreter IN (or interrupting its execution and possibly performing a rollback, as described above), the agent MoB-A preferably generates a report file and sends it to the manager MoB-M, see arrow A3 in FIG. 1 (step 208).

In particular, at step 208 the agent MoB-A preferably initializes a further number of variables, namely:

Network_apparatus_name: name of the network apparatus NA;
Date_time: current date and time;
Apparatus_model_SO: model and SO of the network apparatus NA.

The values at which such variables are initialized is preferably provided to the agent MoB-A based on its knowledge of the network apparatus NA.

Then, at step 208 the agent MoB-A preferably generates a report file name. The report file name preferably comprises a concatenation of the values of the variables Apparatus_model_SO, Network_apparatus_name and Date_time.

Additionally, the report file name also comprises the name of the management task carried out by the agent MoB-A, e.g. "discovery", "configuration" or "monitoring". This way, the report file name allows uniquely identifying the report file.

Then, at step 208 the agent MoB-A preferably gathers the outputs provided by the network apparatus NA upon execution of each command provided by the interpreter IN and inserts them in the report file. The format of the output of each instruction depend on the model, operating system, etc. of the network apparatus NA. According to particularly preferred embodiments, each single output may be put into an apparatus independent format, namely an output format which is unique for all the network apparatuses of the communication network and is independent of the type, operating system, etc. of the specific network apparatus which generated the output. This way, the report files provided by the various network apparatuses are homogeneous. The format of the outputs may be defined by the network manager. For instance, if the network apparatus is a Cisco router, the output of the above mentioned instruction show ip interface brief is a table wherein each row corresponds to an interface and comprises a predefined sequence of fields comprising information relating to the interface, for instance:

TABLE 1

| Interface | IP-Address | OK? | Method | Status | Protocol |
|---|---|---|---|---|---|
| TenGigabitEthernet2/1 | 172.16.181.121 | YES | NVRAM | up | up |
| GigabitEthernet5/11 | 172.16.113.201 | YES | NVRAM | up | up |
| GigabitEthernet6/2 | 163.162.172.143 | YES | NVRAM | up | up |
| Loopback0 | 172.16.117.137 | YES | NVRAM | up | up |

On the other hand, if the network apparatus is a Juniper apparatus, the output of the above mentioned instruction show interfaces terse is a table wherein each row corresponds to an interface and comprises a predefined sequence of fields comprising information relating to the interface, for instance:

TABLE 2

| Interface | Admin | Link | Proto | Local |
|---|---|---|---|---|
| xe-0/0/0.240 | up | up | inet | 172.16.181.233/30 |
| lt-0/2/10.0 | up | up | inet | 192.168.0.1/30 |
| lt-0/2/10.1 | up | up | inet | 192.168.0.2/30 |
| lo0.0 | up | up | inet | 172.16.116.26 |

Preferably, the agents MoB-A running at the network apparatuses that provide as outputs Table 1 and Table 2, format Table 1 and Table 2 into a same apparatus type-independent format. In particular, Table 1 is converted into the following table:

TABLE 3

| interface | Ip_Address | Fisical_status | Logical_status |
|---|---|---|---|
| TenGigabitEthernet2/1 | 172.16.181.121 | up | up |
| GigabitEthernet5/11 | 172.16.113.201 | up | up |
| GigabitEthernet6/2 | 163.162.172.143 | up | up |
| Loopback0 | 172.16.117.137 | up | up | while Table 2 is converted into the following table:

TABLE 4

| Interface | Ip_Address | FIsIcal_status | LogIcal_status |
|---|---|---|---|
| xe-0/0/0.240 | 172.16.181.233/30 | up | up |
| lt-0/2/10.0 | 192.168.0.1/30 | up | up |
| lt-0/2/10.1 | 192.168.0.2/30 | up | up |
| lo0.0 | 172.16.116.26 | up | up |

Then, at step 208 the agent MoB-A preferably loads the report file in the predefined local directory that agent MoB-A and manager MoB-M use for exchanging information. To this purpose, the agent MoB-A preferably uses again the value of the variable Directory_name initialized at step 203.

Then, at step 208 the report file is finally sent to the manager MoB-M. In particular, in case the FTP protocol is used for supporting the exchange of files between agent MoB-A and manager MoB-M, the report file is sent to the FTP server whose name is provided by the variable FTP_server_name initialized at step 203.

Then, the agent MoB-A may return to the execution of static operations, if its predefined logic provides for it. This is the case, for instance, of a monitoring script that, after detecting an unknown alarm on a certain port of the network apparatus NA and, following the instructions of the manager MoB-M, switching off that port, returns to its static operations (e.g. counting packets and periodically sending counters to the NMC).

The execution of the agent MoB-A then ends (step 209). The execution of the agent MoB-A may be ended upon an explicit command from the NMC, in particular from the agent manager AM. Alternatively, the agent MoB-A may automatically end, for instance upon completion of the management task. The condition upon which the execution of the agent MoB-A ends depends on the type of management task which the agent MoB-A is configured to execute. For instance, configuration and discovery scripts end after transmission of their report files to the manager MoB-M, as it will be described herein after. Alternatively, a discovery script may be continuously executed, namely it is constantly kept in a stand-by mode and periodically brought into an active state. On the other hand, a monitoring script is continuously executed at the network apparatus NA, and its execution is not stopped until monitoring a certain data flow is of interest.

Hence, the management on board agent MoB-A executed at the network apparatus NA actively takes part to the execution of management tasks on the network apparatus NA itself, thereby relieving the workload of the NMC. This allows distributing the computational effort required for executing management tasks amongst the various network apparatuses, thereby optimizing the exploitation of the computational resources of the network and minimizing the consumption of bandwidth for transmission of management data between NMC and network apparatuses.

Besides, advantageously, the cooperation with the NMC (and, in particular, with the management on board manager MoB-M) advantageously allows the agent MoB-A automatically adapting its behaviour in a dynamic way to changes occurring in the communication network (e.g. new types of events, new types of hardware, etc.), without requiring the intervention of an operator rewriting and reloading the agent logic each time a change of the agent behaviour is needed. Indeed, while the agent MoB-A is autonomous as far as the execution of the static operations provided by its predefined logic is concerned, the agent MoB-A is advantageously capable of receiving from the management on board manager MoB-M instructions allowing it to cope with some aspects of its management task which may vary over time in an unpredictable way. Hence, though the agent MoB-A has some autonomy from the NMC as far as some static aspects of its management task are concerned, the NMC still keeps control of the dynamic aspects of the management task, intervening when operations shall be done which go beyond the autonomous skills of the agent. Hence, when events not foreseen by the static logic of the agent MoB-A happen, the management on board manager MoB-M exerts its control by sending to the agent MoB-A instructions which the agent uses for complementing its predefined, static logic.

Therefore, all the agents implementing a same management task may have the same predefined logic written in a same programming language for all the network apparatuses using a same programming tool (e.g. TCL for Cisco network apparatuses or Junos for Juniper network apparatuses). The behaviour of each single agent will be then dynamically completed by the manager MoB-M, depending on the needs of the network apparatuses running that agent. This advantageously makes the operation of programming several network apparatuses of a communication network very easy, since a same agent may be loaded on several network apparatuses, without any customization.

It shall also be noticed that the interpreter IN advantageously performs a "mediation function" between NMC and network apparatuses, in that it "masks" the differences between the various network apparatuses (different vendors, different models, different configurations, etc.) so that the NMC sees a communication network made of substantially homogeneous network apparatuses. Indeed, as described above, the interpreter may receive high level instructions and translate them in CLI commands executable in the software environment of the network apparatus NA, and may also customize the received instructions based on the actual configuration of the network apparatus. Therefore, the instructions provided by the manager MoB-M may be generic (and therefore applicable to any network apparatus), since customization of the instructions for a particular network apparatus is made by the interpreter using its knowledge of the network apparatus features (type, model, hardware and software configuration, etc.). Furthermore, the instructions to the agents of the various network apparatuses may be provided in a very generic way using a common format, even if the network apparatuses are heterogeneous, thanks to the mediation function of the interpreters. This advantageously eases the operation of providing instructions to the network apparatuses for management purposes. Similar considerations also apply to the report files provided by the agents that, as mentioned above, may be formatted according to a same unified format by the interpreter.

Figure 3:
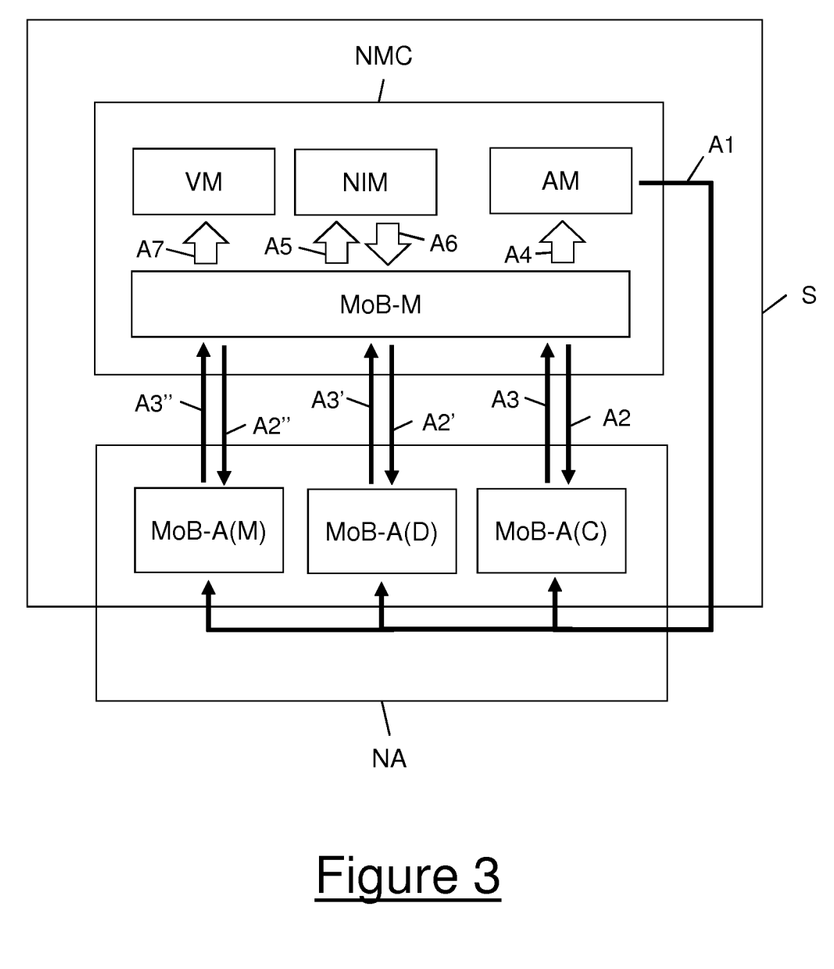
FIG. 3 shows the system of FIG. 1 in further detail.

With reference now to FIG. 3, the structure and operation of the system S will be described in further detail.

As shown in FIG. 3, in addition to the above described management on board manager MoB-M and agent manager AM, the NMC preferably also comprises a visualization manager VM and a network inventory manager NIM. The visualization manager VM and the network inventory manager NIM are preferably configured to cooperate with the management on board manager MoB-M, as it will be described in detail herein after.

Further, by way of non limiting example, it is assumed that—in order to carry out discovery, configuration and monitoring of the network apparatus NA—three different scripts are defined, namely:
 a discovery agent MoB-A(D) suitable for discovering the configuration of the network apparatus NA, in cooperation with the manager MoB-M;
 a configuration agent MoB-A(C) suitable for configuring the network apparatus NA, in cooperation with the manager MoB-M; and
 a monitoring agent MoB-A(M) suitable for monitoring the network apparatus NA, possibly in cooperation with the manager MoB-M.

Each agent MoB-A(D), MoB-A(C) and MoB-A(M) is preferably provided with a respective interpreter similar to the interpreter IN of FIG. 1, which however is not shown in FIG. 3 for simplicity.

The agents MoB-A(D), MoB-A(C) and MoB-A(M) are loaded onto the network apparatus NA by the agent manager AM (see arrow A1 in FIG. 3), which also starts their execution when needed.

For instance, the agent manager AM may load the monitoring agent MoB-A(M) and start its execution on the network apparatus NA when monitoring of the network apparatus NA shall be started. The monitoring agent MoB-A(M) may be configured to provide one or more monitoring services. For instance, the monitoring agent MoB-A(M) may be configured to provide one or more of the following monitoring services:
- performance monitoring in terms of packet loss rate measurement and/or in terms of delay or jitter measurement, e.g. as described by WO 2010/072251, WO 2011/079857, WO 2012/059138, WO 2013/013720 or WO 2013/174417 in the name of the same Applicant;
- performance monitoring as defined by the IP SLA (Internet Protocol Service Level Agreement) by Cisco;
- TWAMP (Two-Way Active Measurement Protocol) or OWAMP (One-Way Active Measurement Protocol) performance monitoring;
- RPM (Real Time Performance Monitoring) by Juniper;
- Y.1731 SLM (Synthetic Loss Measurement);
- Y.1731 LM (Loss Measurement);
- Y.1731 DM (Delay Measurement);
- path analysis PWE3 (Pseudo-Wire Emulation EEE);
- path analysis VPN (Virtual Private Network);
- path analysis VLAN (Virtual Local Area Network).

The above monitoring services are only exemplary.

The monitoring agent MoB-A(M) is continuously or periodically executed at the network apparatus NA, so as to periodically provide the manager MoB-M with monitoring report files comprising the values of the monitored parameters (e.g. packet counters, timestamps, etc.), see arrow A3" in FIG. 3. The manager MoB-M preferably forwards the content of such monitoring report files to the visualization manager VM (see arrow A7 in FIG. 3), which is responsible to display it to a human operator (e.g. for statistical analysis or billing purposes).

The logic of the monitoring agent MoB-A(M) preferably is mainly static, namely the monitoring agent MoB-A(M) is configured so as to be capable of autonomously performing the monitoring task mainly without the need of instructions from the manager MoB-M. However, while it is executing its statically defined logic, the monitoring agent MoB-A(M) may occasionally need instructions from the manager MoB-M (see arrow A2" in FIG. 3). For instance, the monitoring agent MoB-A(M) may require instructions upon detection of events not foreseen by its static logic (e.g. not expected alarms). Furthermore, the manager MoB-M may occasionally provide the monitoring agent MoB-A(M) with instructions at the purpose of e.g. controlling or debugging the agent functionality, or enhancing the monitoring functionality without the need to rewrite and reload the whole agent logic.

Figure 4:
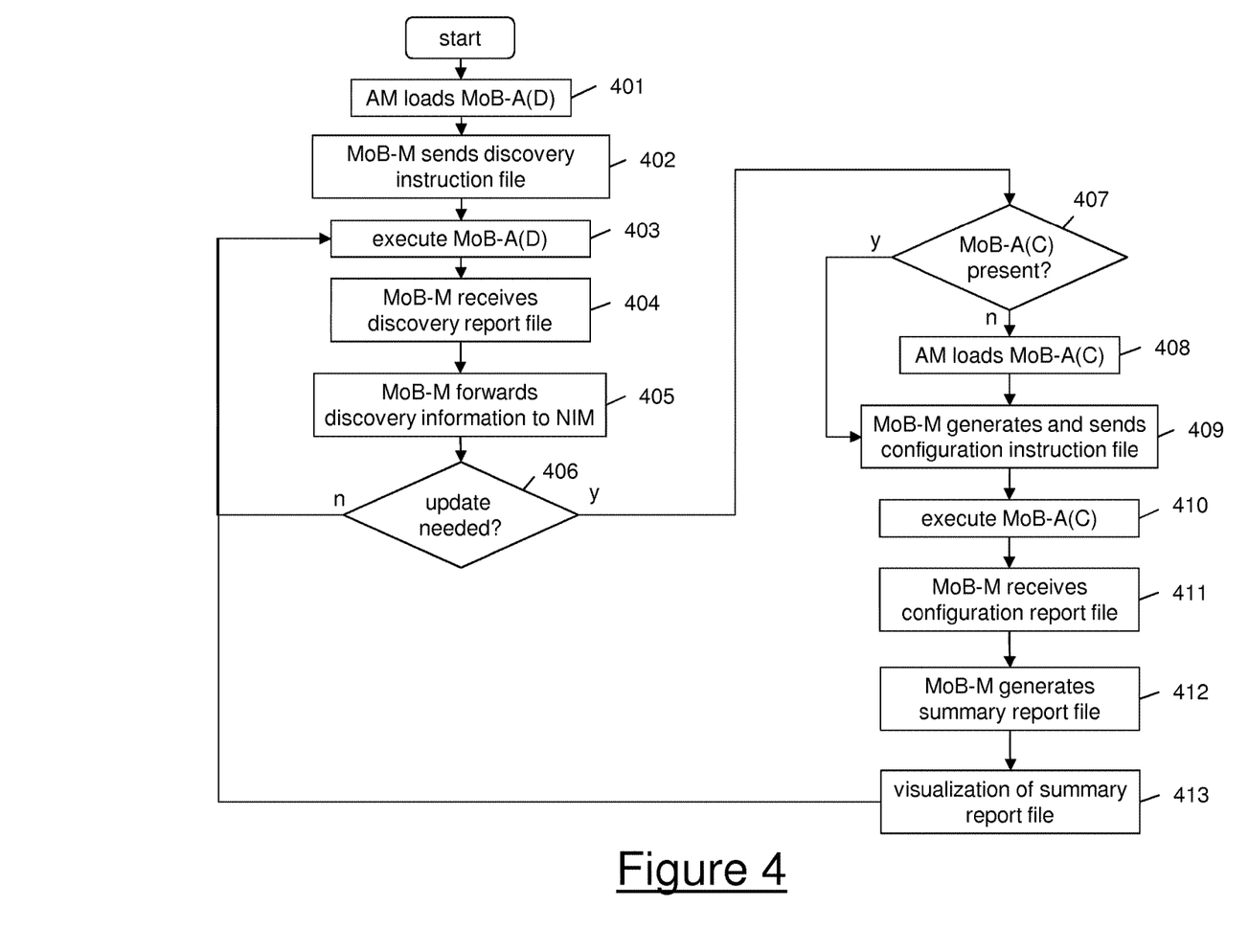
FIG. 4 is a flow chart of an exemplary method for operating the system of FIG. 3.

With reference now to the flow chart of FIG. 4, while the monitoring agent MoB-A(M) is executed as described above, the agent manager AM may load the discovery agent MoB-A(D) onto the network apparatus NA (step 401). The discovery agent MoB-A(D) is preferably configured to perform only few static operations propaedeutic to the retrieval of discovery instructions from the manager MoB-M.

Hence, the manager MoB-M preferably sends a discovery instruction file (step 402, see also arrow A2' in FIG. 3) to a predefined directory of the network apparatus NA, which the discovery agent MoB-A(D) uses for exchanging information with the manager MoB-M. The discovery instruction file is loaded before the execution of the discovery agent MoB-A (D) is started. Hence, by suitably modifying the discovery instruction file, the behaviour of the discovery agent MoB-A(D) may be changed by the manager MoB-M each time the discovery agent MoB-A(D) is executed.

Then, the discovery agent MoB-A(D) is periodically executed (step 403). The execution of the discovery agent MoB-A(D) may be e.g. automatically started at a predefined time of every day. During its execution, the discovery agent MoB-A(D) behaves as described above with reference to FIG. 2, namely: it retrieves the discovery instruction file from the predefined local directory (step 203), it invokes its own interpreter (step 204) which processes the discovery instruction file (205) so as to generate a list of discovery instructions (step 206) which is executed (step 207), and a discovery report file is generated and sent to the manager MoB-M (step 208). The execution of the discovery agent MoB-A(D) then ends (step 209) upon dispatch of the discovery report file (see arrow A3' in FIG. 3).

Then, the discovery report file is preferably received by the manager MoB-M (step 404).

A detailed example of steps 402, 403 and 404 is set forth herein below.

The discovery instructions contained in the discovery instruction file provided by the manager MoB-M may comprise the following discovery instructions:

| [previous discovery instructions] | |
|---|---|
| show mac-address-table dynamic | [provides MAC addresses of devices connected to NA] |
| show arp vrf LTE_TRAFFIC | [provides ARP table with association MAC address - IP address] |

As the discovery agent MoB-A(D) executes the above instructions, the following discovery report file is generated:

| [output of previous discovery instructions] | | | | | |
|---|---|---|---|---|---|
| router1#show mac-address-table dynamic | | | | | |
| vlan | mac address | type | learn | age | ports |
| 3937 | 74c9.9a0f.2d8f | dynamic | Yes | 50 | Gi8/20 efp_id 3937 |
| 3938 | 74c9.9a0f.2d8f | dynamic | Yes | 50 | Gi8/20 efp_id 3938 |
| 3921 | 74c9.9a2e.c920 | dynamic | Yes | 135 | Po255 |
| 3928 | 74c9.9a2e.c920 | dynamic | Yes | 135 | Po255 |
| 3921 | 74c9.9a30.920a | dynamic | Yes | 150 | Po256 |
| 3921 | 74c9.9a30.9456 | dynamic | Yes | 40 | Po255 |

[subsequent lines of MAC address table]

router1#show arp vrf LTE_TRAFFIC

| Protocol | Address | Age (min) | Hardware Addr | Type | Interface |
|---|---|---|---|---|---|
| Internet | 10.1.1.58 | 202 | 24b6.5718.4cc2 | ARPA | Vlan3921 |
| Internet | 10.1.1.59 | 168 | 6c9c.edb1.fb42 | ARPA | Vlan3921 |
| Internet | 10.10.108.193 | — | 0014.f2b3.adc0 | ARPA | Vlan3921 |

[output of previous discovery instructions]

| | | | | | |
|---|---|---|---|---|---|
| Internet | 10.10.108.194 | 130 | 24b6.5718.52c2 | ARPA | Vlan3921 |
| Internet | 10.10.108.200 | 0 | 74c9.9a30.9456 | ARPA | Vlan3921 |
| Internet | 10.10.108.201 | 0 | 74c9.9a30.949c | ARPA | Vlan3921 |

[subsequent lines of ARP table]
Legend:
* primary entry
age - seconds since last seen
n/a—not available Then, the manager MoB-M preferably forwards to the network inventory manager NIM the discovered information relating to the network apparatus NA, so that the network inventory manager NIM may use them to update the network inventory (step 405, see also arrow A5 in FIG. 3).

The manager MoB-M also preferably determines, by cooperating with the network inventory manager NIM, whether an update of the configuration of the network apparatus NA is needed (step 406, see also arrow A6 in FIG. 3). For instance, with reference to the above detailed example, the manager MoB-M determines whether the MAC address table provided by the network apparatus NA upon execution of the discovery instruction show mac-address-table dynamic comprises any new MAC address (namely, a MAC address which was not comprised within the formerly discovered MAC address table), indicating e.g. that a new LTE antenna has been connected to the network apparatus NA and shall be now configured.

If no configuration updates are needed, the execution of the monitoring agent MoB-A(M) is continued until the discovery agent MoB-A(D) is executed again (optionally with a new discovery instruction file, if the discovery functionality has to be modified in the meanwhile).

If a configuration update is needed, the manager MoB-M preferably checks whether the configuration agent MoB-A(C) has already been loaded onto the network apparatus NA (step 407) and, in the negative, instructs the agent manager AM to load it (step 408, see also arrow A4 in FIG. 3). The configuration agent MoB-A(C) preferably is configured to perform only few static operations propaedeutic to the retrieval of configuration instructions from the manager MoB-M.

Hence, the manager MoB-M preferably generates a configuration instruction file based on the content of the receives discovery report file and then sends the configuration instruction file (step 409, see also arrow A2) to a predefined directory of the network apparatus, which the configuration agent MoB-A(C) uses for exchanging information with the manager MoB-M. The configuration instruction file is preferably loaded before the execution of the configuration agent MoB-A(C) is started. Hence, by suitably modifying the configuration instruction file, the behaviour of the configuration agent MoB-A(C) may be changed by the manager MoB-M each time the configuration agent MoB-A(C) is executed.

According to some advantageous variants, the configuration instructions may be provided to the configuration agent MoB-A(C) by the discovery agent MoB-A(D) itself, and not by the manager MoB-M. This may be the case e.g. when a minor, predefined change in the configuration of the network apparatus NA is needed. In this case, in addition to or alternatively to sending the discovery report file to the manager MoB-M, the discovery agent MoB-A(D) itself processes the discovery information and generates a configuration instruction file, without requesting any intervention of the manager MoB-M. Hence, the autonomy of the network apparatus NA is increased.

Then, the configuration agent MoB-A(C) is executed (step 410). The execution of the configuration agent MoB-A(C) may be e.g. automatically started at a predefined time and date (e.g. for synchronizing the configuration of several network apparatuses of the communication network). The execution of the configuration agent MoB-A(C) may also be started by the discovery agent MoB-A(D), if the discovery agent MoB-A(D) is in charge of providing configuration instructions to the configuration agent MoB-A(C) as described above.

During its execution, the configuration agent MoB-A(C) behaves as described above with reference to FIG. 2, namely: it retrieves the configuration instruction file from the predefined local directory (step 203), it invokes its own interpreter (step 204) which processes the configuration instruction file (205) so as to generate a list of configuration instructions (step 206) which is executed (step 207), and a configuration report file is generated and sent to the manager MoB-M (step 208). A rollback may also be provided in case of errors, as described above. The execution of the configuration agent MoB-A(C) then ends (step 209) upon dispatch of the configuration report file (see arrow A3 in FIG. 3).

Upon execution of the configuration agent MoB-A(C), the agent manager AM preferably stops execution of other scripts which are possibly running at the network apparatus NA, such as for instance the monitoring agent MoB-A(M). Then, when the execution of the configuration agent MoB-A(C) ends, the execution of other scripts is preferably resumed.

With reference to the above detailed example, steps 409, 410 and 411 will be described in further detail. It is assumed, by way of example, that a new MAC address is detected within the discovered MAC address table set forth above (e.g. the MAC address 74c9.9a30.9456), indicating that a new LTE antenna has been connected to the network apparatus NA. Then, from the ARP table provided upon execution of the discovery instruction show arp vrf LTE_TRAFFIC, the IP address 10.10.108.200 associated to the new MAC address 74c9.9a30.9456 is also discovered. Assuming that the monitoring agent MoB-A(M) is configured to carry out a performance monitoring in terms of packet loss rate measurement e.g. as described by WO 2010/072251 in the name of the same Applicant, then a configuration instruction file comprising the following configuration instructions is generated:

| | |
|---|---|
| configure terminal | [bring NA into a configuration mode] |
| no event manager policy EEM_policy_ManageR_2U.tcl | [stop execution of MoB-A(M)] |
| interface vlan 3921 | [stop ongoing packet counts] |

-continued

```
no ip access-group PNPM_LTE_in in
no ip access-group PNPM_LTE_out out
exit
no ip access-list extended PNPM_LTE_in        [cancel current access lists]
no ip access-list extended PNPM_LTE_out
ip access-list extended PNPM_LTE_in           [define new access list -
                                               incoming direction]
...
    deny ip any host 1.1.1.19
    permit ip host 10.10.108.200 any
    dscp 13
    deny ip any host 1.1.1.20
    permit ip host 10.10.108.200 any
    dscp 15
...
exit
ip access-list extended PNPM_LTE_out          [define new access list -
                                               outgoing direction]
...
    deny ip host 1.1.1.19 any
    permit ip any host 10.10.108.200
    dscp 13
    deny ip host 1.1.1.20 any
    permit ip any host 10.10.108.200
    dscp 15
...
exit
interface vlan 3921
ip access-group PNPM_LTE_in in                [resume packet counts]
ip access-group PNPM_LTE_out out
exit
event manager policy                          [resume execution
EEM_policy_ManageR_2U.tcl                      of MoB-A(M)]
end
write                                         [save new configuration on
                                               NA]
```

It shall be noticed that the IP address 10.10.108.200 of the new LTE antenna is inserted in the access lists for packet counting both in the incoming direction and outgoing direction.

It shall also be noticed that interruption and resumption of the execution of the monitoring agent MoB-A(M) is explicitly provided within the above configuration instruction file. This is however not limiting. The interruption and resumption of the execution of monitoring agent MoB-A(M) may indeed be provided by the static logic of the configuration agent MoB-A(C) itself. This is possible when a single monitoring agent MoB-A(M) is running at the network apparatus NA, or if the network apparatus NA may autonomously determine which monitoring agent MoB-A(M) shall be interrupted and/or resumed.

As the configuration agent MoB-A(C) executes the above instructions, the following configuration report file is generated:

```
router1#configure terminal
Enter configuration commands, one per line. End with CNTL/Z.
router1(config)#
router1(config)#no event manager policy EEM_policy_ManageR_2U.tcl
router1(config)#
router1(config)#interface vlan 3921
router1(config-if)# no ip access-group PNPM_LTE_in in
router1(config-if)# no ip access-group PNPM_LTE_out out
router1(config-if)#exit
router1(config)#
router1(config)#no ip access-list extended PNPM_LTE_in
router1(config)#no ip access-list extended PNPM_LTE_out
router1(config)#
router1(config)#ip access-list extended PNPM_LTE_in
...
router1(config-ext-nacl)#    deny ip any host 1.1.1.19
router1(config-ext-nacl)#    permit ip host 10.10.108.200 any dscp 13
router1(config-ext-nacl)#    deny ip any host 1.1.1.20
router1(config-ext-nacl)#    permit ip host 10.10.108.200 any dscp 15
...
router1(config-ext-nacl)#exit
router1(config)#
router1(config)#ip access-list extended PNPM_LTE_out
...
router1(config-ext-nacl)#    deny ip host 1.1.1.19 any
router1(config-ext-nacl)#    permit ip any host 10.10.108.200 dscp 13
router1(config-ext-nacl)#    deny ip host 1.1.1.20 any
router1(config-ext-nacl)#    permit ip any host 10.10.108.200 dscp 15
...
router1(config-ext-nacl)#exit
router1(config)#
router1(config)#interface vlan 3921
router1(config-if)# ip access-group PNPM_LTE_in in
router1(config-if)# ip access-group PNPM_LTE_out out
router1(config-if)#exit
router1(config)#
router1(config)#
router1(config)#event manager policy EEM_policy_ManageR_2U.tcl
router1(config)#
router1(config)#end
router1#write
```

It shall be noticed that, upon execution of each line of the instruction file, the network apparatus NA returns a copy of the configuration instruction with a prompt with the name of the network apparatus NA (by way of example, "router1"). Empty lines of the configuration instruction file give raise to a corresponding line within the configuration report file, which comprise only the prompt. In case the configuration instruction can not be properly executed, its output also comprises an error message. In such case, the execution of the subsequent configuration instructions is omitted and a rollback is optionally performed.

The configuration report file is then preferably received by the manager MoB-M (step 411). Then, based on the content of the configuration report file, the manager MoB-M preferably generates a summary report file comprising e.g. a summary of possible problems arisen during the configuration procedure (step 412). The manager MoB-M preferably forwards the summary report file to the visualization manager VM (see arrow A7 in FIG. 3), which is responsible of displaying the summary report file to a human operator (step 413).

Hence, the discovery agent MoB-A(D), the configuration agent MoB-A(C) and the monitoring agent MoB-A(M) as described above actively take part to the execution of the discovery, configuration and monitoring tasks on the network apparatus NA itself. Besides, advantageously, the cooperation with the manager MoB-M advantageously allows such agents to automatically adapt or change their behaviour in a dynamic way, without requiring the intervention of an operator rewriting and reloading the script. Indeed, the management on board manager MoB-M exerts its control by sending to the agents discovery, configuration or monitoring instructions, which the agents use for complementing their predefined, static logic.

The invention claimed is:

1. A system for managing a network apparatus of a communication network, the system comprising:
   a network management center including a management-on-board manager; and
   a management-on-board agent executable at the network apparatus;
   wherein the management-on-board agent is configured to perform, when executed at the network apparatus, a number of static operations to carry out at least part of a management task on the network apparatus, said static operations being explicitly defined by a predefined logic of said management-on-board agent, the management-on-board agent being further configured to dynamically modify a behavior of the management-on-board agent by adapting to possible events related to the network apparatus not foreseen by the predefined logic of the management-on-board agent by retrieving, during execution of the at least part of the management task, at least one instruction from the management-on-board manager identifying a further operation, translating the at least one instruction into a corresponding network apparatus-specific instruction, to complete the management task and execute the at least one translated instruction for completing the management task.

2. The system according to claim 1, wherein the management-on-board agent is configured to start and/or stop the execution of the at least part of the management task upon reception of a command from the network management center.

3. The system according to claim 1, wherein the management-on-board agent is configured to retrieve the at least one instruction from the management-on-board manager upon occurrence of an event not foreseen by logic of the management-on-board agent.

4. The system according to claim 1, wherein the management-on-board agent is configured to retrieve the at least one instruction from the management-on-board manager each time the management-on-board agent is executed, the management task being carried out by default through execution of the at least one instruction from the management-on-board manager.

5. The system according to claim 1, wherein the management-on-board manager is configured to transmit the at least one instruction to the network apparatus before execution of the management-on-board agent is started.

6. The system according to claim 1, wherein the management-on-board manager is configured to transmit the at least one instruction to the network apparatus while the management-on-board agent is executed.

7. The system according to claim 1, wherein the at least one instruction is in a form of an ordered list of single instructions compatible with an operating system of the network apparatus and directly executable by the network apparatus.

8. The system according to claim 7, wherein the management-on-board agent is configured to sequentially execute one-by-one the instructions of the ordered list of single instructions.

9. The system according to claim 7, wherein the ordered list of single instructions is included within an instruction file, each single instruction being set forth in a respective line of the instruction file.

10. The system according to claim 7, wherein the management-on-board agent is configured to perform one or more of the following operations upon each single instruction of the ordered list of single instructions:

correct syntax errors;

check whether the single instruction is an allowed instruction;

when the single instruction is a single apparatus-independent instruction whose format is unique for all network apparatuses of the communication network, translate the single instruction into a corresponding instruction compatible with an operating system of the network apparatus and directly executable by the network apparatus; and customize the single instruction based on the actual configuration of the network apparatus.

11. The system according to claim 7, wherein the management-on-board agent is further configured to interrupt execution of the ordered list of single instructions, if an instruction could not be properly executed.

12. The system according to claim 11, wherein the management-on-board agent is further configured to annul instructions of the ordered list of single instructions that have been executed by performing a number of other commands.

13. The system according to claim 1, wherein the at least one instruction is in a form of an ordered list of single apparatus-independent instructions, a format of the instructions being unique for all network apparatuses of the communication network.

14. The system according to claim 1, wherein the management-on-board agent is further configured to detect at least one output generated by the network apparatus upon execution of the at least one instruction.

15. The system according to claim 14, wherein the management-on-board agent is further configured to generate a report file containing the at least one output generated by the network apparatus upon execution of the at least one instruction and to send the report file to the network management center.

16. The system according to claim 14, wherein the management-on-board agent is further configured to format the at least one output generated by the network apparatus upon execution of the at least one instruction into an apparatus independent format which is unique for all network apparatuses of the communication network.

17. A method for managing a network apparatus of a communication network, the method comprising:

executing a management-on-board manager at a network management center cooperating with the communication network; and executing a management-on-board agent at the network apparatus to perform a number of static operations to carry out at least part of a management task on the network apparatus, said static operations being explicitly defined by a predefined logic of said management-on-board agent, wherein the management-on-board agent, dynamically modifies a behavior of the management-on-board agent by adapting to possible events related to the network apparatus not foreseen by the predefined logic of the management-on-board agent, and retrieves, during execution of the at least part of the management task, at least one instruction from the management-on-board manager identifying a further operation, translates the at least one instruction into a corresponding network apparatus-specific instruction, to complete the management task and executes the at least one translated instruction for completing the management task.

* * * * *